No. 787,529. PATENTED APR. 18, 1905.
K. O. MUEHLBERG.
HOSE CONNECTOR.
APPLICATION FILED FEB. 18, 1904.
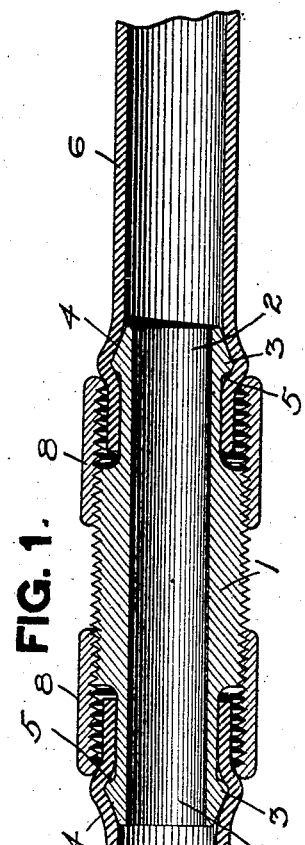
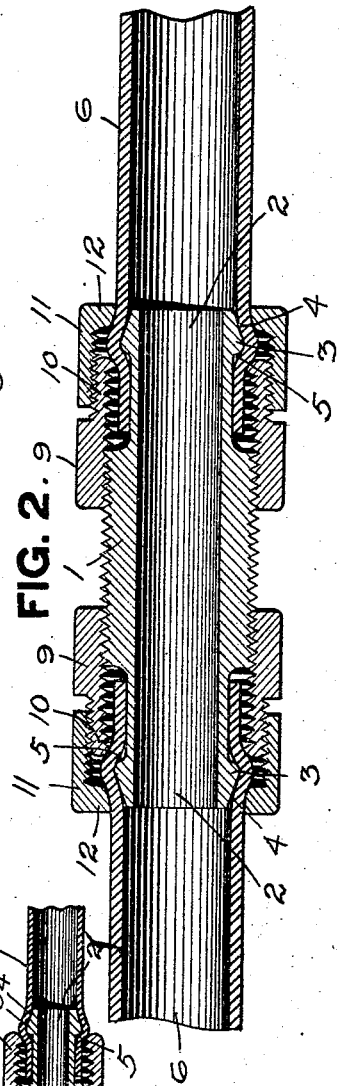
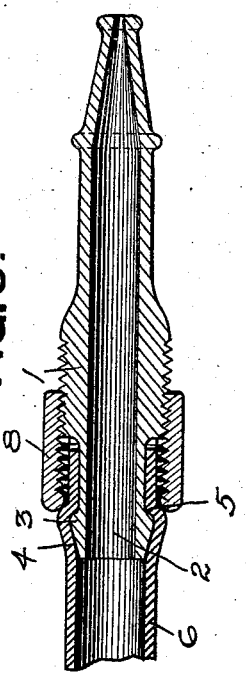
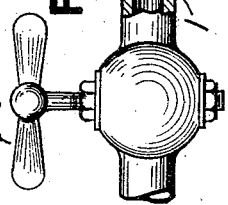
WITNESSES. INVENTOR.

No. 787,529. Patented April 18, 1905.

UNITED STATES PATENT OFFICE.

KARL O. MUEHLBERG, OF HOMESTEAD, PENNSYLVANIA.

HOSE-CONNECTOR.

SPECIFICATION forming part of Letters Patent No. 787,529, dated April 18, 1905.

Application filed February 18, 1904. Serial No. 194,216.

*To all whom it may concern:*

Be it known that I, KARL O. MUEHLBERG, a resident of Homestead, in the county of Allegheny and State of Pennsylvania, have invented a new and useful Improvement in Hose-Connectors; and I do hereby declare the following to be a full, clear, and exact description thereof.

My invention relates to hose-connectors; and the object is to provide a device of this character which can be applied to the hose without the use of a tool of any kind and which will form a secure and water-tight connection with the hose.

All hose-couplings as now constructed comprise two members, one for attachment to each section of the hose, and which must be secured thereto by wire, bands, or other means which require special tools to apply and which generally cannot be applied tightly except by an experienced person. My hose-connector is designed to overcome this defect in prior devices and to provide a connector which can be applied to the hose without the use of a tool of any kind and by an unskilled person and which forms a water-tight connection with the hose.

In the accompanying drawings, Figure 1 is a longitudinal section through the simplest form of my hose-connector. Fig. 2 is a similar view showing a modification thereof; and Figs. 3 and 4 are sectional views showing the invention applied to a nozzle and spigot, respectively.

In all forms of my hose-connector I provide a member 1, which is externally threaded and provided either at one or both ends, depending upon its use, with a projecting nipple 2, which in turn is provided at or near its outer end with an external annular rib or bead 3, this rib or bead forming, in effect, a head on the end of said nipple and preferably being provided with a sloping outer face 4, so that it can be readily slipped into the hose, and with a sharp or abrupt inner shoulder 5. In use this nipple is slipped inside of the hose 6, as shown in the drawings. Coöperating with this internal member 2 is an external sleeve 8, having a threaded connection with the member 1, as shown, so as to be capable of moving longitudinally thereof. In the simplest form of the connector, as shown in Fig. 1, the sleeve 8 has a plain internal face and is adapted to pass externally of the hose 6, and the end thereof will clamp said hose against the shoulder 5 on the rib 3. In this manner the hose 6 is given a sharp bend, as shown in Fig. 1, and is clamped tightly between the rib 3 and sleeve 8.

In the modification shown in Fig. 2 the member 1 is also threaded externally, and screwed thereon is an internally-threaded sleeve 9, provided with a projecting collar portion 10, which is also externally threaded. This collar is adapted to project out over the nipple 2 and is so arranged as to leave an annular space between itself and said nipple, into which space the end of the hose will project. A supplemental sleeve 11 has a threaded connection with the collar 10 and is provided with an inwardly-projecting lip 12. The sleeve or collar 10 clamps the hose against the inner face of the rib 3, and in addition thereto the inwardly-projecting lip 12 on the sleeve 11 clamps the hose against the outer face of the rib 3, so that the hose is clamped at two points and a very secure connection formed.

Either of my forms of connectors may be used for the attachment of a hose to a nozzle, as shown in Fig. 3, or to a spigot, as shown in Fig. 4. In this case the member 1, with its nipple 2 and bead 3, is formed as a part of the nozzle or spigot, respectively, and the sleeve 8 is threaded onto the body thereof, as shown.

The clamping-sleeve 8 of Fig. 1 and the corresponding sleeve 9 of Fig. 2 move outwardly on the body—that is, toward the annular projection 3. Back of this annular projection the body is reduced to a depth greater than the thickness of the hose. The clamping-sleeve has a straight interior and as it moves outwardly will not catch the end of the hose and push it off the nipple, the space provided being sufficient to give ample room for the end of the hose.

It will be observed that with all forms of my hose-connector no wiring or bands are needed for attaching the same to the hose, but that the attachment can be made merely by the hands of the operator without the use of any tool. The sleeves or other rotary members in all cases are provided with knurled or similar roughened outer faces, so that they can be easily turned by hand. As a consequence, the connector can be applied at any time and at any place and when applied will form a very secure and water-tight joint with the hose. It is adapted for use with hose for conveying water, steam, compressed air, or for any other high-pressure mechanism.

What I claim is—

1. A hose-connector comprising a body having a threaded exterior and a projecting portion provided with an external annular enlargement designed to be inserted inside the hose, said body being reduced back of the annular enlargement to a greater depth than the thickness of the hose and said annular enlargement being of less diameter than the body, and a clamping-sleeve having a straight threaded interior to engage the threaded exterior of the body and arranged to move outwardly over the hose and clamp the same against the annular enlargement.

2. A hose-connector comprising a member provided with a projecting nipple having an external annular enlargement, a collar or sleeve on said member and located externally of said nipple to leave an annular space therebetween, and a sleeve having a threaded connection with said collar and arranged to pass over the hose and clamp the same against the annular enlargement of said nipple.

3. A hose-connector comprising a member provided with a projecting nipple having an annular enlargement thereon, an annular collar or sleeve on said member and located externally of said nipple to leave an annular space therebetween, and a sleeve having a threaded connection with said collar and provided with an inwardly-projecting annular lip and arranged to pass over the hose and clamp the same against the annular enlargement of said nipple.

4. A hose-connector comprising a member provided with a projecting nipple having an annular enlargement thereon, a sleeve having a threaded connection with said member and located externally of said nipple so as to leave an annular space therebetween, and a clamping-sleeve having a threaded connection with said first-named sleeve and arranged to pass over the hose and clamp the same against the annular enlargement of said nipple.

5. A hose-connector comprising a member provided with a projecting nipple having an annular enlargement thereon, a sleeve having a threaded connection with said member and located externally of said nipple to leave an annular space therebetween, and a clamping-sleeve having a threaded connection with said first-named sleeve and provided with an inwardly-projecting rib or lip and arranged to pass over the hose and clamp the same against the annular enlargement of said nipple.

6. A hose-connector comprising an externally-threaded member provided on each end with a projecting nipple having an annular enlargement thereon, and having at each end an annular collar located externally of said nipples to leave annular spaces therebetween, and two clamping-sleeves internally threaded and engaging said collars and provided with inwardly-projecting ribs or lips and arranged to pass over the hose and clamp the same against the annular enlargements of said nipples.

7. A hose-connector comprising an externally-threaded member provided on each end with a projecting nipple having an annular enlargement thereon, a pair of collars internally threaded and engaging said member and in turn being externally threaded and arranged to project over said nipples to leave annular spaces therebetween and to clamp the hose against the annular enlargements on said nipples, and clamping-sleeves internally threaded and engaging the external threads of said collars and provided with inwardly-projecting beads or ribs arranged to pass over the hose and clamp the same against the annular enlargements of said nipples.

In testimony whereof I, the said KARL O. MUEHLBERG, have hereunto set my hand.

KARL O. MUEHLBERG.

Witnesses:
ROBERT C. TOTTEN,
G. C. RAYMOND.